United States Patent

Yamamoto et al.

[11] Patent Number: 5,360,203
[45] Date of Patent: Nov. 1, 1994

[54] FLOATATION PRESSURE PAD FOR METAL STRIPS

[75] Inventors: Tadashi Yamamoto, Takarazuka; Takao Seno, Mino; Yoshito Sakaguchi, Kyoto, all of Japan

[73] Assignee: Chugai Ro Co., Ltd., Osaka, Japan

[21] Appl. No.: 82,837

[22] Filed: Jun. 28, 1993

[30] Foreign Application Priority Data

Jun. 29, 1992 [JP] Japan .................... 4-170542

[51] Int. Cl.⁵ .................................................. C21D 1/74
[52] U.S. Cl. ................................... 266/110; 266/111; 266/249; 266/251; 266/258; 266/274
[58] Field of Search ............... 266/110, 111, 249, 251, 266/258, 274,

[56] References Cited

U.S. PATENT DOCUMENTS

| 1,948,173 | 2/1934 | Hagan | 266/102 |
| 4,148,600 | 4/1979 | Croft et al. | 266/111 |
| 5,118,366 | 6/1992 | Shintaku | 266/111 |

FOREIGN PATENT DOCUMENTS 0202023 11/1986 European Pat. Off. .
2615258 10/1977 Germany .
60-45256 10/1985 Japan .
60-56216 12/1985 Japan .

OTHER PUBLICATIONS

Patent Abstracts of Japan, vol. 9, No. 301 (C-316) (2024) 1985 & JP-A-60 138 019.

Primary Examiner—Richard O. Dean
Assistant Examiner—Robert R. Koehler
Attorney, Agent, or Firm—Birch, Stewart, Kolasch & Birch

[57] ABSTRACT

A pressure pad comprises a plenum chamber, adapted to be conneceted to a pressurized-fluid supply means, having a pair of parallel slit nozzles formed in a top wall, and the chamber is arranged underneath a path of a strip. The plenum chamber is provided with holes in the top wall and at least two obstructions on the top wall. The holes are arranged on imaginary lines that extend between the nozzles on both sides of the top wall and central portions thereof point to adjacent edges of the path. Each of the obstructions comprises at least one obstructing wall arranged on either side of one of the imaginary lines. The lines may have V-, Arch- or Bracket-shaped configurations.

5 Claims, 4 Drawing Sheets

FLOATATION PRESSURE PAD FOR METAL STRIPS

BACKGROUND OF THE INVENTION

1. Field of the Invention

This invention relates to a floater-type heat treating furnace, especially floatation-type pressure pads which are designed to float a continuous strip of material, e.g. aluminum, copper or steel, on a fluidized bed as the strip moves through the furnace. The pressure pad can be located both over and underneath the strip.

2. Description of the Prior Art

Pressure pads are widely used to float metal strips of easily deformed materials through a heat treating furnace because such strips can be damaged if they contact rigid rolls which normally support and move metal strips through the furnace.

Generally, as shown in FIG. 7, each pad 40 comprises a plenum chamber 41. The plenum chamber 41 comprises two parallel rows or lines of jet nozzles 42,42' which extend one edge to the another edge of a strip and are perpendicular to the movement of the strip S. They are designed to direct streams or jet of fluid such as gas from a plenum chamber 41 to float the strip S. Each row of jet nozzles 42,42' may consist of a continuous slit or slot which is coextensive with the width of the strip S. These nozzles 42,42' are designed to create static pressure by blowing gas against the strip.

With prior pressure pads 40, previous to this invention, large amount of fluid moves toward edges of the strip S and then escapes from the area underneath the strip S easily. By not containing the fluid properly, area B of the effective static pressure underneath the strip S tends to be small. Consequently, it has been difficult to float strips steadily and results in fluttering or scratching, especially when hot fluid is used because of low density of hot fluid gas. Therefore, it has taken large amount of fluid to float strips.

SUMMARY OF THE INVENTION

It is therefore an object of the present invention to provide a pressure pad which is so constructed as to stably support metal strips with high efficiency.

The above and other objects of the present invention are achieved by providing a pressure pad for metal strips, comprising a plenum chamber, adapted to be conneceted to a pressurized-fluid supply means, having a pair of parallel slit nozzles formed in a top wall of the chamber, and the chamber being arranged underneath a path of a continuously floating strip, characterized in that the plenum chamber is provided with a plurality of holes in the top wall thereof and at least two obstructing means on the top wall thereof, the holes being arranged on imaginary lines that extend between the slit nozzles on both sides of the top wall and central portions thereof point to adjacent edges of the path, and each of the obstructing means comprising at least one obstructing wall arranged on either side of one of the imaginary lines. Preferrably, the distributors are slidably secured to the top plate. Moreover, the lines may preferrably be V-shaped, Arch-shaped, or Bracket-shaped configurations.

According to the present invention, each pad has two or more V-, Arch- or Blacket shaped rows of holes, pointing toward sides of the path or strip and between the slits of 10 fluid nozzles. In our example, there are six V-shaped rows of holes, three at one side another three at another side. At both sides of each row of the holes, there are two small obstructing walls which can be moved perpendicular to the movement of the strip and parallel to the slits to adjust the size of the holes, thereby changing the amount of gas flows through the holes. These obstructing walls are normally L-shaped; they stand perpendicular to the plenum chamber. However, they can be V-shaped and slanted toward the central portion of the pad, whereby fluid can be directed toward the central portion of the pad to create more static pressure than L-shaped obstructing walls. These obstructing walls also trap gas which is blown from the slits and the holes to create effective static pressure. With the obstructing walls preventing fluid from escaping from underneath the strip and pressure created by the fluid emitted from the plenum chamber through the slits and the holes, the area of the static pressure underneath the strip tends to be large. That is, with the improved pressure pads, large amount of fluid escapes parallel to the movement of the strip, but lesser amount of fluid escapes from the edges of the strip; this means that more static pressure underneath the strip can be obtained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following description taken in conjunction with the preferred embodiments thereof with reference to the accompanying drawings, throughout which like parts are designated by like reference numerals, and in which.

DETAILED DESCRIPTION OF THE PREFERRED EMBODIMENTS

Figure 1:
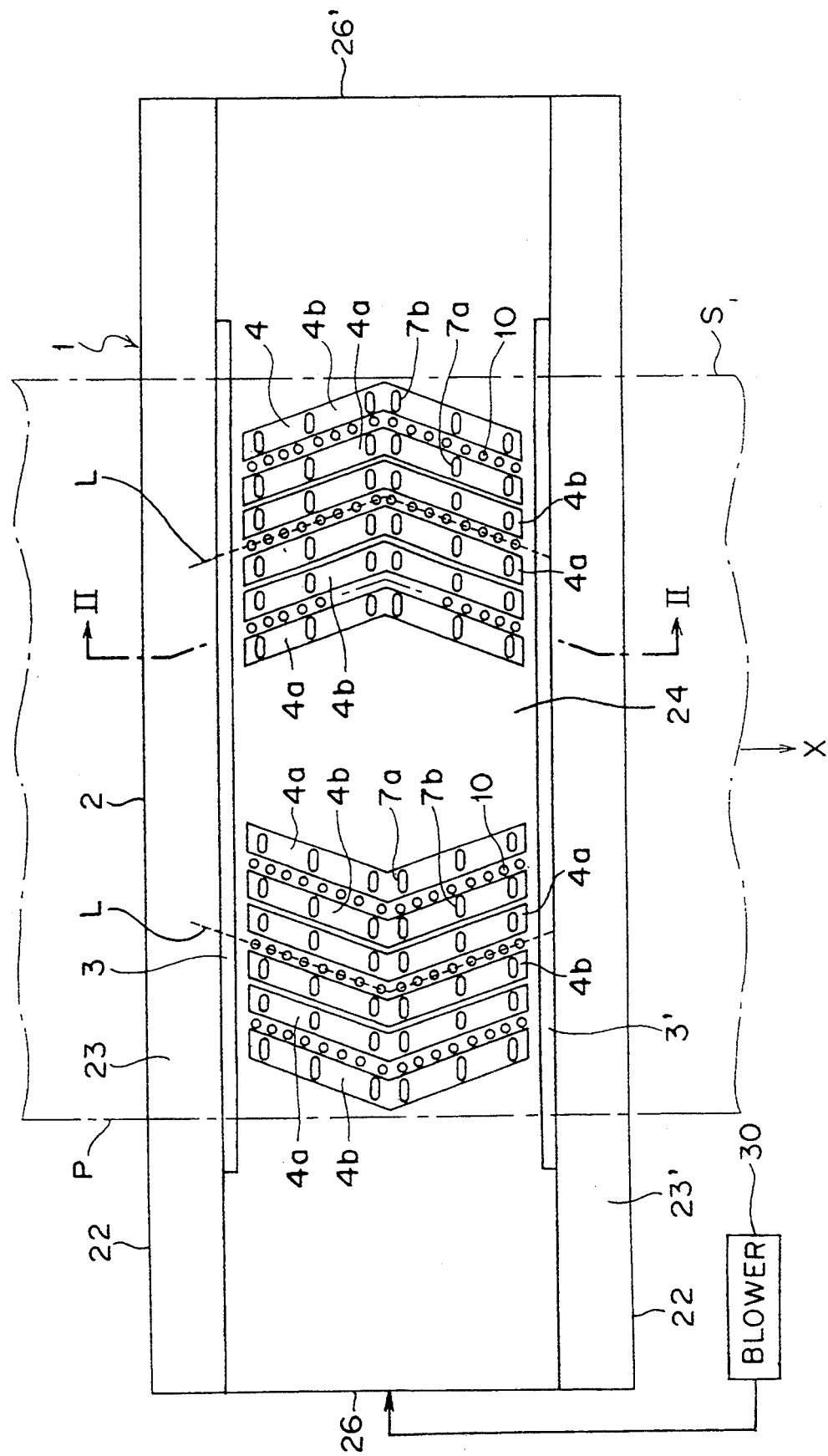
FIG. 1 is a view of the pressure pad, looking from above through a strip.
Figure 2:
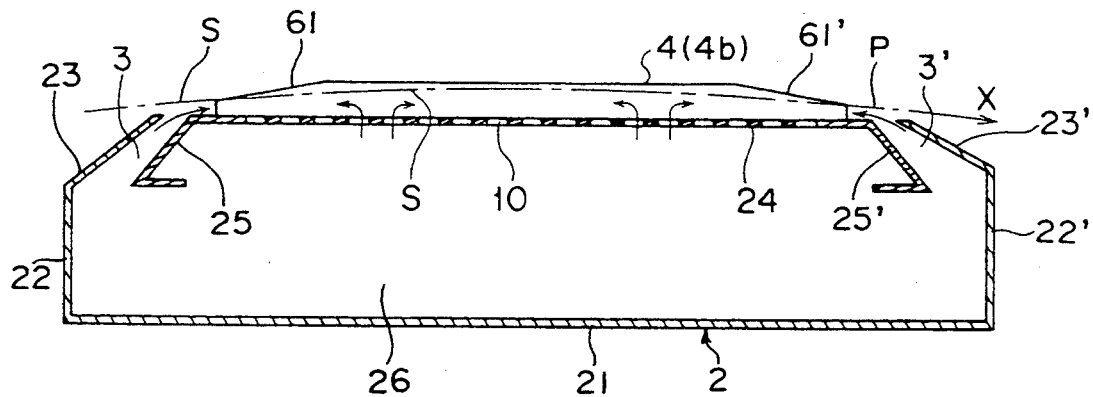
FIG. 2 is a cross-sectional view of the pad from the line II—II of FIG. 1.

Referring now to FIGS. 1 and 2, there is shown a pressure pad, generally indicated by numeral 1, embodying the present invention. The pressure pads 1 are arranged side by side along the underneath a path P of a strip Sand connected to a pressurized-fluid supply means such as blower 30.

The pressure pad 1 comprises a plenum chamber 2 having means for blowing a fluid upon underside of a strip S that moves on the path P and a plurality of obstructing means 4.

The plenum chamber 2 consists of a bottom wall 21, side walls 22,22', a top wall 24, and end walls 26,26'. Each side wall 22(22') extends upwardly from the longitudinal side of the bottom wall 21 and is bent inwardly at the upper part thereof to form an inwardly-inclined portion 23(23'). The top wall 24 is disposed between the opposed inclined portions 23,23' and spaced therefrom to form a pair of parallel slit or lines of jet nozzles 3,3' along with the inclined portions 23,23' of the side walls 22,22'. The top wall 24 has downwardly-inclined guide plates 25,25' on both sides to taper the nozzles 3,3'. The end walls 26,26' enclose both ends of the body 2, respectively.

The top plate 24 also has a plurality of holes 10 provided therein. Those holes 10 are arranged at regular intervals on imaginary V-shaped parallel lines L which are divided into two groups by a center line of the top wall 24 parallel to the center line of the moving path P of the strip S as shown in FIG. 1. The imaginary V-shaped lines L of each group are so arranged that the central portion thereof are pointed outwardly, i.e., to the adjacent edges of the path P.

Figure 3:
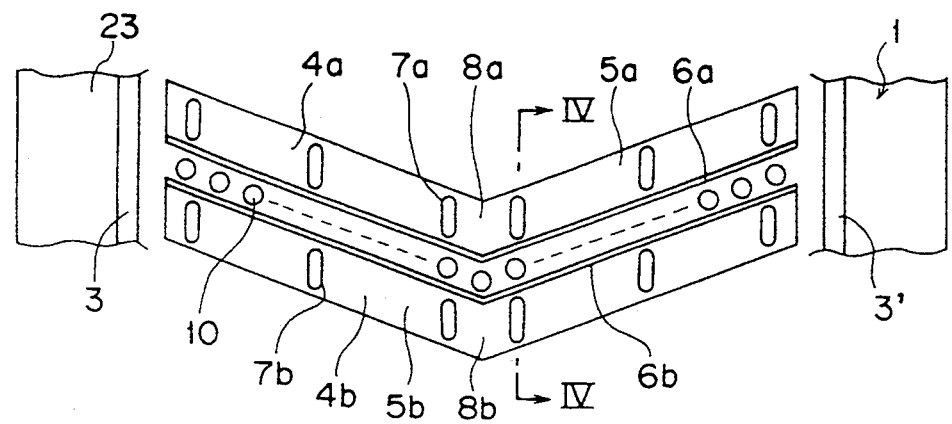
FIG. 3 is a view of the holes and the pair of obstructing walls.
Figure 4:
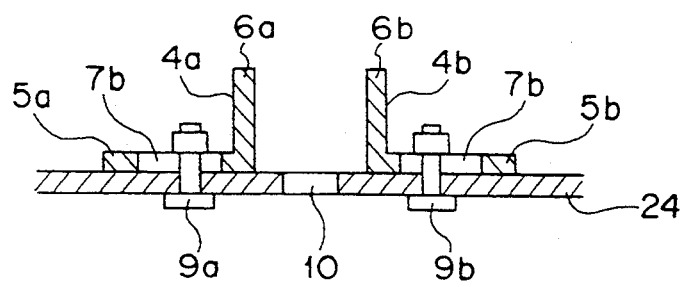
FIG. 4 is a cross-sectional view of the obstructing walls from the line IV—IV of FIG. 3.
Figure 5:
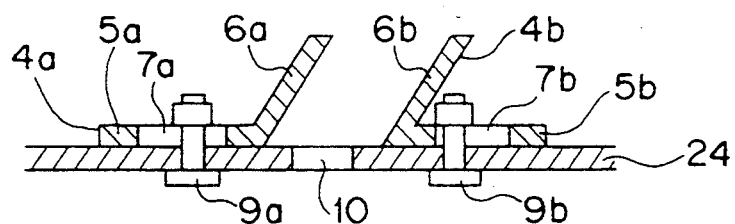
FIG. 5 is a cross-sectional view of the obstructing walls of another type from the line IV—IV of FIG. 3.

As shown in detail in FIGS. 3 and 4, each obstructing means 4 consists of a pair of elongated members; i.e., an inner and outer obstructing walls 4a, 4b. The inner obstructing wall 4a has a V-shaped base portion 5a and a V-shaped vertical portion 6a extending upwardly from an outer edge of the base portion 5a along the entire length thereof. The vertical portion 6a is cut at the anterior and posterior corners to form inclined portions 61,61'. The outer obstructing wall 4b has a similar configuration except that the vertical portion 6b is provided at the inner edge of the base portion 5b. Further, each base portion 5a,5b is provided with a plurality of elongated openings 7a,7b for slidably attachment to the top plate 24 at suitable intervals.

The inner and outer obstructing walls 4a,4b in each pair are opposed each other and located on both sides of the V-shaped lines so that the holes 10 are present between the vertical portions 6a and 6b. The obstructing walls 4a,4b are secured to the top plate 24 by bolts 9a,9b, after adjusting the size of the holes 10, thereby changing the amount of fluid flows through the holes 10.

Figure 6:
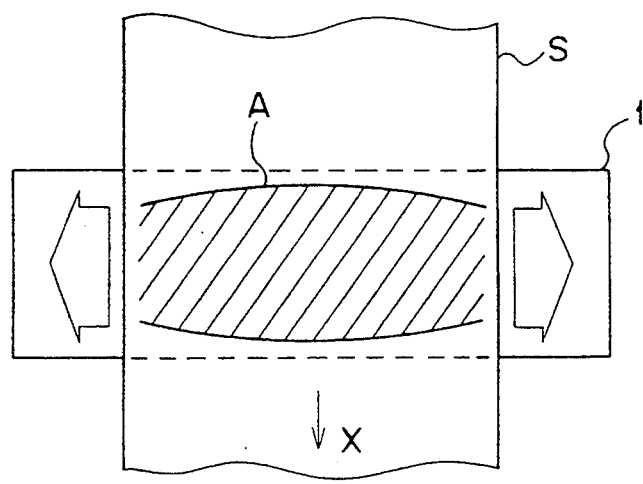
FIG. 6 is a schematic view of the effective static pressure zone which is indicated in the middle with slanted parallel lines and directions of gas flow which are indicated as arrows; they are made accordance with the invention.
Figure 7:
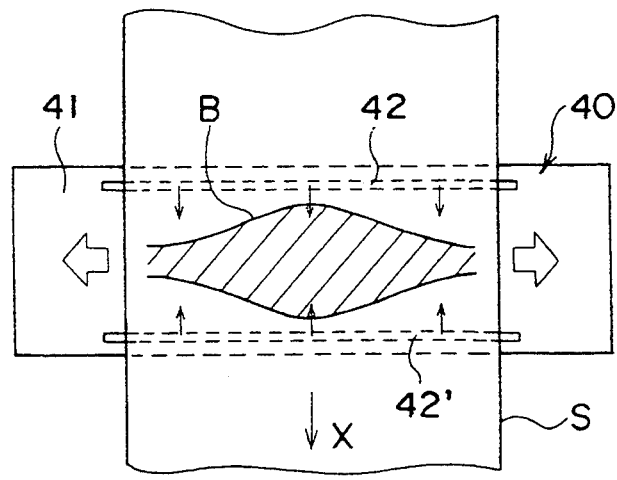
FIG. 7 is a schematic view of the effective static pressure zone which is indicated in the middle with slanted parallel lines and directions of fluid flow which are indicated as arrows; they are made accordance with previous pressure pads.

In use, a pressurized fluid supplied from the blower 30 is fed to the plenum chamber 2 of the pressure pad 1 and then blown upon the underside of the strip S through the nozzles 3,3 and holes 10. In this case, the fluid obliquely blown from one nozzle 3 converges with that blown from the other nozzle 3' and then tends to flow toward the edges of the strip S. However, the fluid blown from the holes 10 form fluid curtains, and cooperates with the obstructing means 4 to prevent the converged fluid from flowing toward the edges of the strip S. In addition, the vertical portions 6a,6b of the inner and outer obstructing walls 4a,4b have V-shaped configurations and arranged with their central portions (bent portions) 8a,8b pointed to the adjacent end walls 26,26', respectively, so that they are capable of efficiently preventing the fluid from flowing toward the edges of the strip S and escaping therefrom. Thus, the pressurized fluid is confined within the region defined by the nozzles 3,3' together with the obstructing walls 4a,4b. Consequently, as shown in FIG. 6, a static pressure zone A is increased to an extent sufficient to support the strip S stably over the pressure pad 1.

In the above embodiment, the vertical portions 6a,6b are provided perpendicularly with the base portions 5a,5b, respectively, but they may be inclined inwardly toward the center of the path P. In this option, the greater effective static pressure can be obtained than using the L-shaped obstructing plates. Also, the holes can be slanted toward the central portion of the pad 1 so that fluid can be blown toward the central portion of the pad 1 and the static pressure underneath the strip S can become greater than one with the normal holes 10.

Further, in the above embodiment, there are pairs of obstructing walls, such as inner and outer obstructing walls 4a,4b. However, inner and outer obstructing walls 4a,4b do not necessarily have to be paired; only inner obstructing wall 4a can be used both sides of the pad 1, or only outer obstructing wall 4b; moreover, both inner and outer obstructing plates 4a,4b can be mixed.

Moreover, there is no need to arrange a plurality of obstructing means 4 on both sides of the path P. Similar effects can be obtained by providing only one distributor 4 on each side.

Furthermore, the inner and outer obstructing walls 4a,4b have V-shaped configurations, but they may be of an Arch-shaped, or Bracket-shaped configuration.

Figure 8:
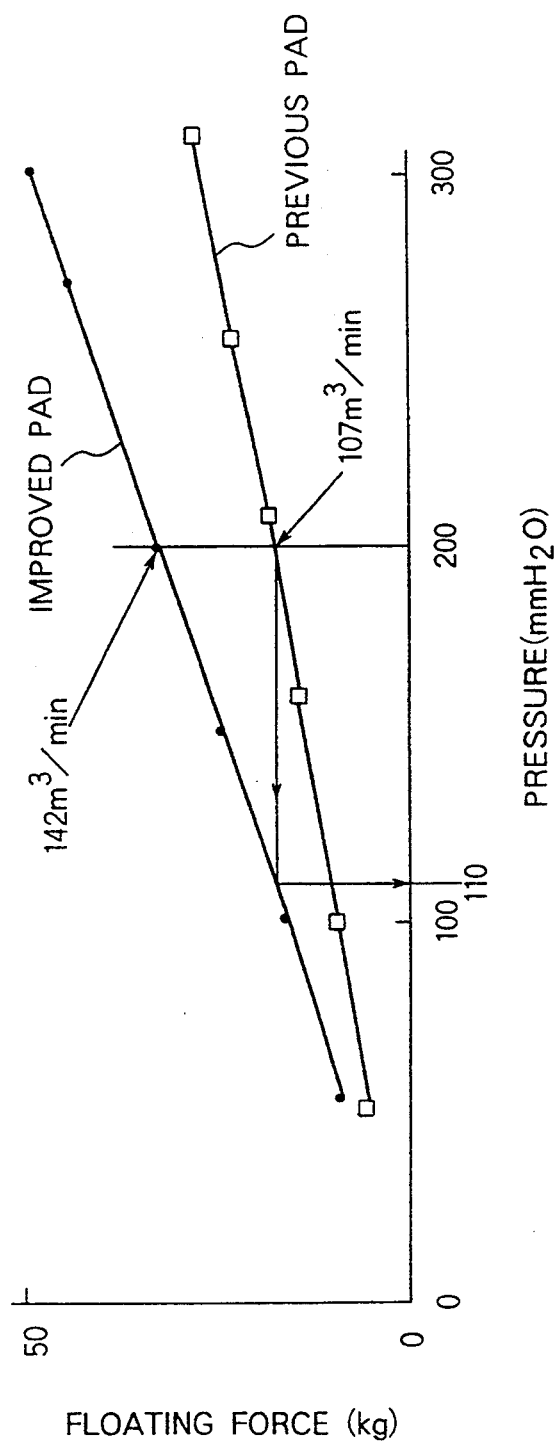
FIG. 8 is a graph which shows floating forces of the improved pressured pad, the present invention, and a previous pressure pad, prior to this invention.

In FIG. 8, a graph indicates the difference in floating forces between the improved pressure pad and the previous pressure pad. The following table shows the difference in floating forces at gas pressure of 200 mm H$_2$O.

|  | Floating force (kg) | Flow rate (m$^3$/min) |
| --- | --- | --- |
| The improved pressure pad | 33 | 142 |
| The previous pressure pad | 18.5 | 107 |

As shown in the table above, at gas pressure of 200 mm H$_2$O, the improved pressure pad can obtain a floating force of 33 kg, whereas the previous pressure pad 18.5 kg; the improved pressure pad can get 1.78 times more force than a previous pressure pad. Now, at the same gas pressure, a flow rate of the improved pressure pad is 142(m$^3$/min), whereas a previous pressure pad 107(m$^3$/min); the ratio of the flow rates is 1.33 (=142/107). The real ratio of floating forces of the improved pressure pad and the previous pressure pad at the gas pressure is given by dividing the ratio of the floating forces (1.78) by the ratio of the flow rates (1.33); this comes out to be 1.34. This number means that the improved pressure pad can obtain 34% more than previous pressure pad at the gas pressure.

From FIG. 8, in order to obtain a floating force of 18.5kg by using the previous pressure pad, gas pressure of 200 mm H$_2$O is required; on the other hand, by using the improved pressure pad, 110 mm H$_2$O is needed to get the same floating force of 18.5 kg. Also, for the improved pressure pad, the flow rate at this gas pressure of 110 mm H$_2$O is 106 m$^3$/min.

$$142(m^3/min) \cdot \sqrt{(110/200)} = 106(m^3/min)$$

Moreover, the power that is needed to obtain the flow rate of 106 m$^3$/min at the gas pressure of 110 mm H$_2$O by the improved pressure pad is 55% of the power needed for the previous pressure pad to obtain 107 m$^3$/min at the gas pressure of 200 mm H$_2$O. Corollary, using the improved pressure pad can save 45% of the energy which is needed to get the same flow rate by using the previous pressure pad.

$$W = (P \cdot Q)/(T \cdot \eta)$$

where
  W: power  P: pressure  Q: flow rate
  T: time interval  $\eta$: efficiency $$\begin{aligned} C &= (P1 \cdot Q1)/(P2 \cdot Q2) \\ &= (110 \cdot 106)/(200 \cdot 107) \\ &= 0.55 \end{aligned}$$

where
  C: power ratio  P1,P2: pressure  Q1,Q2: flow rate

As can be seen from the above description, the pressurized fluid blown upon the underside of the strip is prevented from flowing toward the edges of the strip by the obstructing means, thereby a static pressure zone is established to the full extend, resulting in increasing the floating force of the strip. Further, fluid blown from the holes form curtains which stably maintain the static pressure zone. Therefore, even if fluid of an elevated temperature is supplied to the pressure pad, it is possible to obtain a sufficient floating force for supporting the strip. That is, even using gas of an elevated temperature will provide a stable floating state of a heavy strip.

Further, enlargement of the static pressure zone will result in a stable moving of the strip without waving from side to side or fluttering, thereby eliminating the damage such as scratching.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A flotation pressure pad for metal strips, comprising:
  a plenum chamber, connectable to a pressurized-fluid supply means, having a pair of parallel slit nozzles formed in a top wall of the chamber, and said chamber being arranged underneath a path of a continuously floating strip,
  wherein said plenum chamber is provided with a plurality of holes in the top wall thereof and at least two obstructing means on the top wall thereof, said holes being arranged on imaginary lines that extend between said slit nozzles on both sides of the top wall and central portions thereof point to adjacent edges of the path, and each of said obstructing means comprising at least one obstructing wall arranged on either side of one of said imaginary lines.

2. A pressure pad as claimed in claim 1, wherein said obstructing means are slidably secured to said top wall.

3. A pressure pad as claimed in claim 1 or 2, wherein said lines have V-shaped configurations.

4. A pressure pad as claimed in claim 1 or 2, wherein said lines have Arch-shaped configurations.

5. A pressure pad as claimed in claim 1 or 2, wherein said lines have Bracket-shaped configurations.

* * * * *